US012786569B2

(12) United States Patent
Konno

(10) Patent No.: US 12,786,569 B2
(45) Date of Patent: Nov. 3, 2026

(54) CONTROL APPARATUS AND CONTROL METHOD THEREFOR

(71) Applicant: CANON KABUSHIKI KAISHA, Tokyo (JP)

(72) Inventor: Hajime Konno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 18/930,303

(22) Filed: Oct. 29, 2024

(65) Prior Publication Data

US 2025/0159350 A1 May 15, 2025

(30) Foreign Application Priority Data

Nov. 9, 2023 (JP) ................................ 2023-191717

(51) Int. Cl.
*H04N 23/695* (2023.01)
*H04N 23/69* (2023.01)

(52) U.S. Cl.
CPC .......... *H04N 23/695* (2023.01); *H04N 23/69* (2023.01)

(58) Field of Classification Search
CPC ............................ H04N 23/69; H04N 23/695
See application file for complete search history.

(56) References Cited

U.S. PATENT DOCUMENTS

| | | | | |
|---|---|---|---|---|
| 5,430,511 | A * | 7/1995 | Paff | H04N 23/695 396/300 |
| 6,628,887 | B1 * | 9/2003 | Rhodes | H04N 5/77 348/E7.086 |
| 2005/0036036 | A1 | 2/2005 | Stevenson | |
| 2013/0222651 | A1 * | 8/2013 | Kagei | H04N 5/262 348/335 |
| 2016/0094790 | A1 * | 3/2016 | Yu | H04N 21/6587 348/169 |
| 2016/0100099 | A1 * | 4/2016 | Oyman | H04L 65/65 348/14.08 |
| 2019/0179216 | A1 | 6/2019 | Cao | |
| 2021/0058557 | A1 * | 2/2021 | Koga | H04N 23/62 |

FOREIGN PATENT DOCUMENTS

| | | | | |
|---|---|---|---|---|
| JP | H07107373 A | | 4/1995 | |
| JP | 2011520362 A | * | 7/2011 | H04N 23/631 |
| WO | WO-2024051330 A1 | * | 3/2024 | H04N 23/695 |

OTHER PUBLICATIONS

The above patent documents was cited in a European Search Report issued on Mar. 17, 2025, that issued in the corresponding European Patent Application No. 24210511.2.

* cited by examiner

*Primary Examiner* — Chikaodili E Anyikire
*Assistant Examiner* — Shanika M Brumfield
(74) *Attorney, Agent, or Firm* — Cowan, Liebowitz & Latman, P.C.

(57) ABSTRACT

A control apparatus for controlling an image capturing unit capable of changing an imaging direction, comprises: a driving unit configured to perform driving to change the imaging direction of the image capturing unit; and a video processing unit configured to process a video obtained by the image capturing unit and output the video. The driving unit changes, at least based on an aspect ratio of the video, a driving speed in changing the imaging direction of the image capturing unit.

9 Claims, 14 Drawing Sheets

| | | OPTICAL ZOOM | | | | |
|---|---|---|---|---|---|---|
| | | Wide | ⇔ | Middle | ⇔ | Tele |
| SPEED STAGE | ① | 1 | 1 | 1 | 1 | 1 |
| | ② | 3 | 3 | 2 | 1 | 1 |
| | ③ | 5 | 4 | 3 | 2 | 1 |
| | ④ | 9 | 7 | 5 | 3 | 2 |
| | ⑤ | 15 | 12 | 9 | 6 | 3 |

| | PAN | TILT |
|---|---|---|
| V1 | 2 | 1 |
| A1 | 20 | 10 |
| A2 | 10 | 5 |
| D2 | -10 | -5 |
| D1 | -20 | -10 |

FIG. 8

| | ASPECT RATIO | |
|---|---|---|
| | W : V | V : W |
| SPEED TABLE Pan | A | AV/WX |
| ACCELERATION TABLE Pan | B | BV/WX |
| SPEED TABLE Tilt | C | CV/WXY |
| ACCELERATION TABLE Tilt | D | DV/WXY |

FIG. 10

| | ASPECT RATIO | |
|---|---|---|
| | 16 : 9 | 9 : 16 |
| SPEED TABLE Pan | A | 9A/32 |
| ACCELERATION TABLE Pan | B | 9B/32 |
| SPEED TABLE Tilt | C | 9C/64 |
| ACCELERATION TABLE Tilt | D | 9D/64 |

CONTROL APPARATUS AND CONTROL METHOD THEREFOR

BACKGROUND OF THE INVENTION

Field of the Invention

The present invention relates to pan/tilt control of an image capturing apparatus.

Description of the Related Art

A pan/tilt apparatus (PT camera) mounted with an image capturing apparatus and capable of turning the image capturing apparatus in the pan/tilt direction is used. There is also provided a PTZ camera having a zoom function in addition to a pan/tilt function. By making full use of the pan/tilt function or the zoom function, a photographer can capture an object in various compositions.

When the pan/tilt function and the zoom function are used together in the PTZ camera, a captured video including unnaturalness in a screen change may be obtained. Japanese Patent Laid-Open No. 7-107373 (patent literature 1) discloses a technique of reducing unnaturalness of a screen change in a captured video by changing the speed of a pan/tilt operation in accordance with a zoom state.

Some pan/tilt apparatuses can change the aspect ratio of a video. If the pan/tilt function is used in the pan/tilt apparatus and the aspect ratio of a video is changed, a captured video including unnaturalness in a screen change may be obtained, similar to a case where the pan/tilt function and the zoom function are used together. For example, an operator who operates the pan/tilt apparatus while viewing a captured video obtained by the pan/tilt apparatus may have a sense of discomfort with operation feeling before and after the change of the aspect ratio of the video.

However, in the technique described in patent literature 1, it may be impossible to effectively reduce unnaturalness of a screen change with respect to a captured video when the pan/tilt function is used and the aspect ratio of the video is changed. As a result, for example, it becomes difficult for the operator of the pan/tilt apparatus to appropriately instruct a pan/tilt operation for tracking an object.

SUMMARY OF THE INVENTION

According to one aspect of the present invention, a control apparatus for controlling an image capturing unit capable of changing an imaging direction, comprises: a driving unit configured to perform driving to change the imaging direction of the image capturing unit; and a video processing unit configured to process a video obtained by the image capturing unit and output the video, wherein the driving unit changes, at least based on an aspect ratio of the video, a driving speed in changing the imaging direction of the image capturing unit.

The present invention reduces a sense of discomfort associated with a pat/tilt control operation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing examples of the adjustment amounts of the speed/acceleration before and after the crop operation;

FIG. 10 is a table showing practical examples of the adjustment amounts of the speed/acceleration;

DESCRIPTION OF THE EMBODIMENTS

Figure 1:
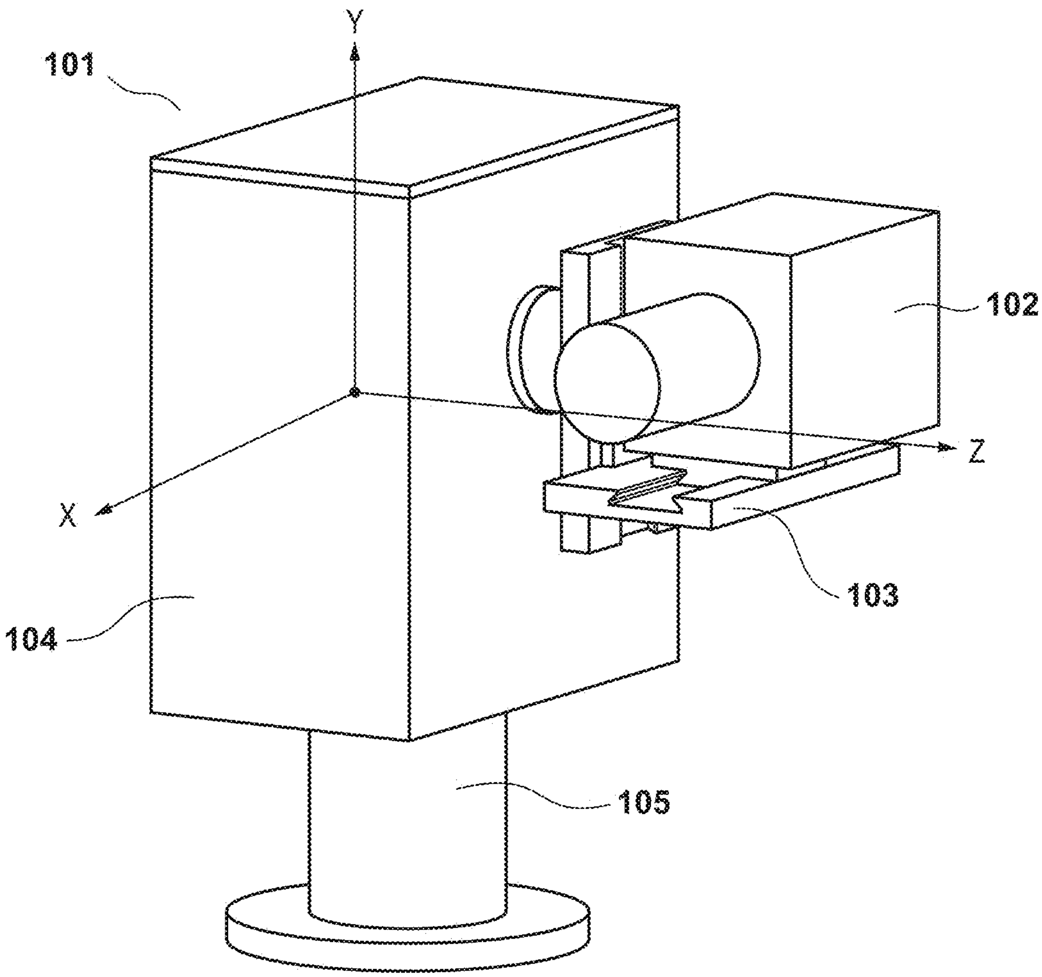
FIG. 1 is a perspective view of a pan/tilt apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of a control apparatus according to the present invention, a system control unit that controls pan/tilt driving in a pan/tilt apparatus 101 (pan/tilt camera) including an image capturing unit will be exemplified below.

<Arrangement of Pan/Tilt Apparatus>

FIG. 1 is a perspective view of the pan/tilt apparatus 101. The pan/tilt apparatus 101 includes an image capturing apparatus 102 fixed to a fixed base 103. The pan/tilt apparatus 101 can rotate a head 104 in the pan direction (horizontal direction) with respect to a pedestal 105 by controlling a driving unit in the head 104. In addition, the pan/tilt apparatus 101 can rotate the fixed base 103 in the tilt direction (vertical direction) with respect to the head 104. By performing the rotation operations in the pan direction and the tilt direction in combination, the image capturing apparatus 102 can change the imaging direction to various directions. In the following description, assume that an XYZ orthogonal coordinate system shown in FIG. 1 is set. More specifically, a vertical upward direction is defined as a Y-axis direction and rotation in the pan direction is performed about the Y-axis. The rotation axis of rotation in the tilt direction is defined as a Z-axis.

<Configuration of General Imaging System>

Figure 2:
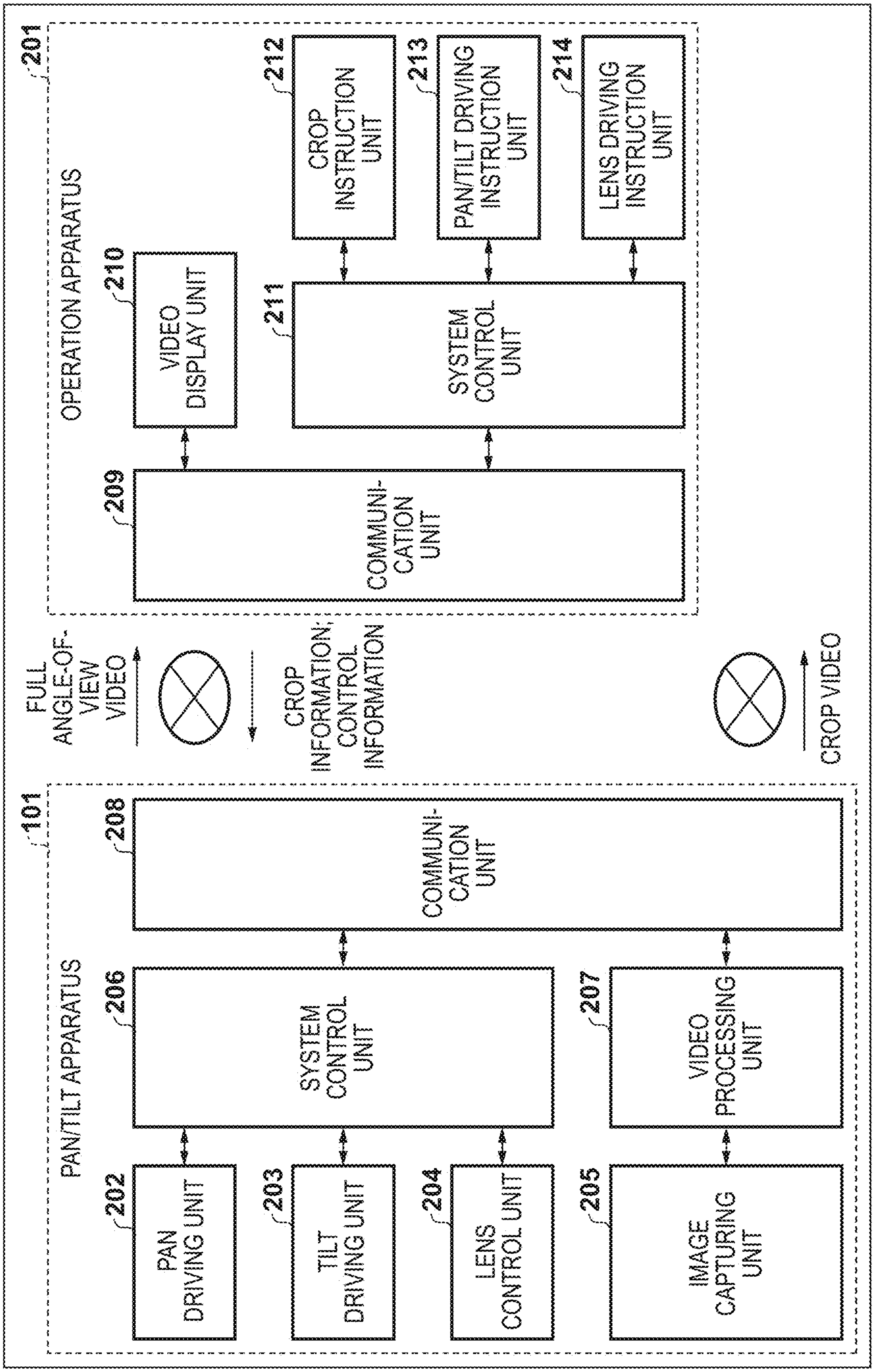
FIG. 2 is a block diagram showing the configuration of a general imaging system.

FIG. 2 is a block diagram showing the configuration of a general imaging system. The imaging system includes the pan/tilt apparatus 101 and an operation apparatus 201 as a user terminal, which are connected via a network. The pan/tilt apparatus 101 distributes a crop video to one or more monitoring apparatuses (not shown) based on an imaging condition set via remote control by the operation apparatus 201. Note that in a network (from the pan/tilt apparatus 101 to the operation apparatus 201) shown in the upper portion of FIG. 2, a full angle-of-view video (a video of an entire image obtained by the image capturing unit 205) is transmitted. On the other hand, in a network (from the pan/tilt apparatus 101 to one or more monitoring apparatuses (not shown)) shown in the lower portion of FIG. 2, a crop video (a video within a range designated by the operation apparatus 201) is transmitted.

The pan/tilt apparatus 101 includes a pan driving unit 202, a tilt driving unit 203, a lens control unit 204, an image capturing unit 205, a system control unit 206, a video processing unit 207, and a communication unit 208.

The pan driving unit 202 performs motor driving to move the imaging direction of the image capturing apparatus 102 to the pan direction. The tilt driving unit 203 performs motor driving to move the imaging direction of the image capturing apparatus 102 to the tilt direction. The lens control unit 204 performs focus control and/or zoom control of the image capturing apparatus 102. The communication unit 208 communicates with another apparatus (in this example, the operation apparatus 201) via the network.

The image capturing unit 205 corresponds to the image capturing apparatus 102 shown in FIG. 1, and outputs, as a video signal, an optical video formed on an image sensor via an optical system (lens). The video processing unit 207 processes the input video signal, and outputs it as video data. Note that if crop processing is instructed, the video processing unit 207 processes a video signal of a designated region, and outputs it as video data. The system control unit 206 is a control unit that comprehensively controls the respective units in the pan/tilt apparatus 101.

The operation apparatus 201 includes a communication unit 209, a video display unit 210, a system control unit 211, a crop instruction unit 212, a pan/tilt driving instruction unit 213, and a lens driving instruction unit 214.

The communication unit 209 communicates with another apparatus (in this example, the pan/tilt apparatus 101) via the network. The crop instruction unit 212 instructs the pan/tilt apparatus 101 to perform a crop operation. For example, when the crop instruction unit 212 accepts a distribution instruction of a crop video from an operator, it transmits crop information (second control command) to the pan/tilt apparatus 101. The crop information includes information representing a specific region to be cropped in the entire image obtained by the image capturing unit 205. Note that so-called digital zoom corresponds to a crop operation when the aspect ratio remains unchanged. The pan/tilt driving instruction unit 213 transmits control information (first control command) concerning a pan/tilt operation to the pan/tilt apparatus 101. The lens driving instruction unit 214 instructs the pan/tilt apparatus 101 to perform focus control and/or zoom control. The video display unit 210 displays video data received from the pan/tilt apparatus 101 and/or a graphical user interface (GUI) for accepting an operation.

The operator of the operation apparatus 201 operates the crop instruction unit 212, the pan/tilt driving instruction unit 213, and the lens driving instruction unit 214 while viewing a video displayed on the video display unit 210. Each of the crop instruction unit 212, the pan/tilt driving instruction unit 213, and the lens driving instruction unit 214 accepts, from the operator, an instruction via an operation of a joystick, a button, or the like. In this case, each unit may be configured to accept an operation (mouse operation or the like) on the GUI. The system control unit 211 is a control unit that comprehensively controls the respective units in the operation apparatus 201.

Note that each of the video processing unit 207, the system control unit 206, and the system control unit 211 can be implemented by software when, for example, a central processing unit (CPU) executes a program. However, some or all of the units may be implemented by hardware such as an Application Specific Integrated Circuit (ASIC).

Upon accepting an operation from the operator, the operation apparatus 201 sends, to the network via the communication unit 209, an operation command to the pan/tilt apparatus 101 corresponding to the operation contents. When the pan/tilt apparatus 101 receives the operation command via the communication unit 208, the system control unit 206 executes control corresponding to the operation command.

For example, when the operation apparatus 201 accepts a driving instruction of pan/tilt driving from the operator via the pan/tilt driving instruction unit 213, driving instruction information is processed by the system control unit 211, and sent to the pan/tilt apparatus 101 via the communication unit 209. In the pan/tilt apparatus 101, the system control unit 206 processes the driving instruction information received by the communication unit 208, and transmits a driving command to the pan driving unit 202 and the tilt driving unit 203.

In the operation apparatus 201, upon accepting a driving instruction (focus and/or zoom) of lens driving from the operator via the lens driving instruction unit 214, driving instruction information is processed by the system control unit 211 and sent to the pan/tilt apparatus 101 via the communication unit 209. In the pan/tilt apparatus 101, the system control unit 206 processes the driving instruction information received by the communication unit 208, and transmits a driving command to the lens control unit 204.

The video signal generated by the image capturing unit 205 is processed by the video processing unit 207, and is then sent to the operation apparatus 201 via the communication unit 208 and displayed on the video display unit 210. Furthermore, in the operation apparatus 201, upon accepting a crop instruction from the operator via the crop instruction unit 212, crop instruction information is processed by the system control unit 211 and sent to the pan/tilt apparatus 101 via the communication unit 209. In the pan/tilt apparatus 101, based on the crop instruction information received by the communication unit 208, the video processing unit 207 crops the video signal generated by the image capturing unit 205, and outputs it as a crop video.

<Configuration of Imaging System (First Embodiment)>

Figure 3:
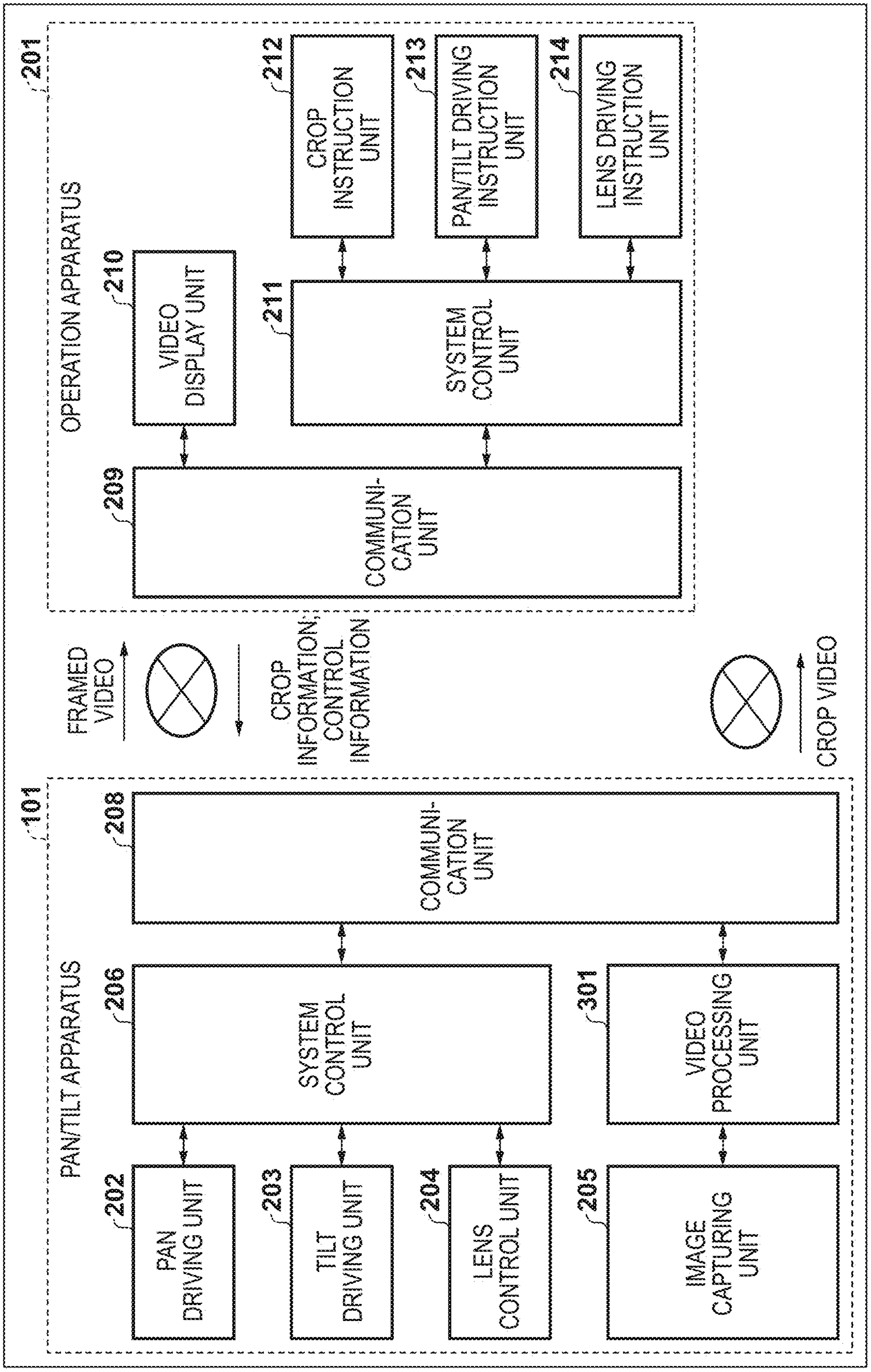
FIG. 3 is a block diagram showing the configuration of an imaging system (First Embodiment)

FIG. 3 is a block diagram showing the configuration of an imaging system according to the first embodiment. Similar to the general configuration (FIG. 2), the imaging system includes the pan/tilt apparatus 101 and the operation apparatus 201, which are connected via the network. The pan/tilt apparatus 101 distributes a full angle-of-view video or a crop video to one or more monitoring apparatuses (not shown) based on an imaging condition set via the operation apparatus 201. In a network (from the pan/tilt apparatus 101 to the operation apparatus 201) shown in the upper portion of FIG. 3, unlike FIG. 2, a crop-framed video (a full angle-of-view video on which a crop frame is overlaid and displayed, which will be referred to as a framed video hereinafter) is transmitted. That is, contents of processing in a video processing unit 301 of the pan/tilt apparatus 101 are different from FIG. 2. More specifically, the video processing unit 301 transmits, to the operation apparatus 201, a framed video obtained by adding (overlaying) the crop-framed image on the full angle-of-view video based on a video signal generated by the image capturing unit 205 and crop information received from the operation apparatus 201.

Figures 4, 5:
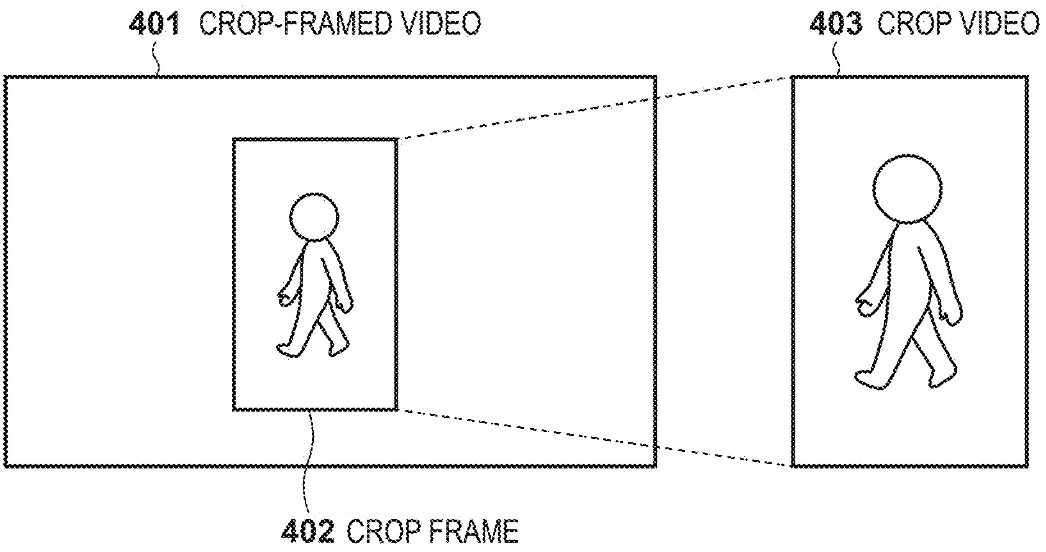
FIG. 4 is a view for explaining a crop-framed video and a crop video.
FIG. 5 is a table showing a speed table.

FIG. 4 is a view for explaining a framed video 401 and a crop video 403. As described above, the framed video 401 is a video to be transmitted to the operation apparatus 201, and the crop video 403 is a video to be distributed to one or more monitoring apparatuses (not shown).

The framed video 401 is a video obtained by overlaying and displaying a crop frame 402 on the full angle-of-view video, and the region size of the crop frame 402 is the same as a size instructed by the crop instruction unit 212. That is, the video in the crop frame of the framed video 401 and the crop video 403 are videos in the same region range and the time is also synchronized.

The operator of the operation apparatus 201 operates the pan/tilt driving instruction unit 213 while viewing the framed video 401 displayed on the video display unit 210. More specifically, the operator operates the pan/tilt driving instruction unit 213 so an object (for example, a human body shown in FIG. 4) does not deviate from the crop frame 402 to track the object.

<Adjustment of Speed and Acceleration in Pan Direction and Tilt Direction>

Subsequently, setting of the speed and acceleration in the pan direction and the tilt direction in the pan/tilt apparatus 101 will be described. The speed indicates the driving speed (for example, the unit is deg/sec), and the acceleration indicates the driving acceleration (for example, the unit is deg/sec$^2$).

FIG. 5 is a table showing a speed table. For example, the speed table is stored in the system control unit 206, and defines the reference speed of motor driving. In FIG. 5, a numeral represents not an actual speed but the relative magnitude (coefficient) of the speed. In this example, five stages of speed settings are included as the speed table. At each stage, a different speed is set in accordance with the degree of optical zoom (that is, the imaging angle of view). More specifically, since it is set so that the speed tends to be relatively high when performing imaging at a wide angle, and tends to be relatively low when performing imaging in a telescopic mode, the operator readily operates the pan/tilt apparatus 101. Note that the appropriate speed may be different between the pan direction and the tilt direction, and thus individual speed tables (that is, a reference pan speed and a reference tilt speed) may be set for the pan direction and the tilt direction.

Figures 6A, 6B:
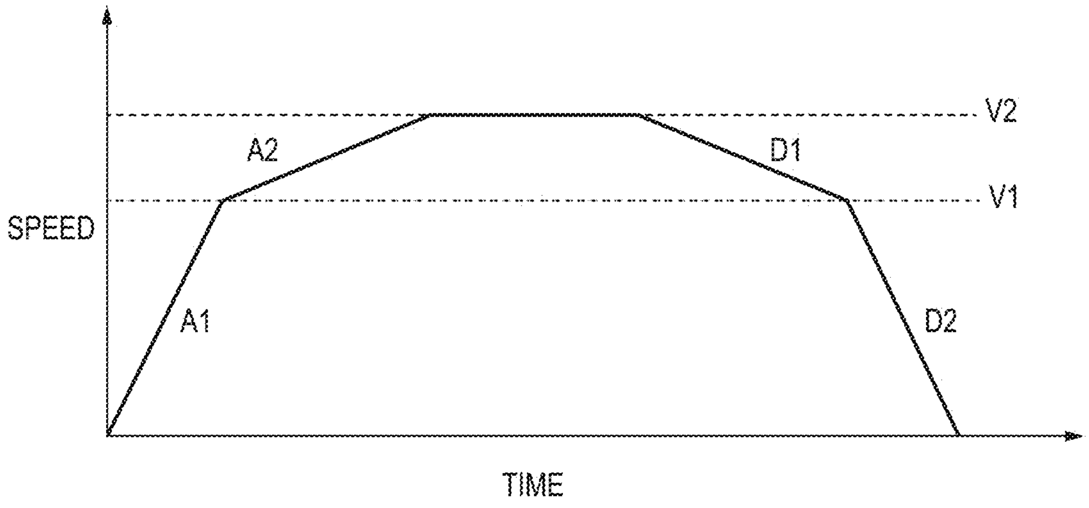
FIGS. 6A and 6B are a table and a timing chart showing an acceleration table and an example of a speed change, respectively.

FIG. 6A is a table showing an acceleration table, and FIG. 6B is a timing chart showing an example of a speed change when the acceleration table is used. In FIG. 6A, a numeral represents not an actual speed or acceleration but the relative magnitude (coefficient) of the speed or acceleration. In FIG. 6B, the abscissa represents an elapsed time, the ordinate represents the speed (angular velocity), and the inclination of the graph indicates the acceleration.

In the acceleration table (FIG. 6A), two stages of accelerations (A1 and A2) during acceleration and two stages of accelerations (D1 and D2) during deceleration are defined. V1 represents a speed threshold when the acceleration is switched. V2 represents a target speed. With these settings, the speed change of the pan/tilt operation becomes smooth, and thus the operator readily operates the pan/tilt apparatus 101. Note that the appropriate acceleration may be different between the pan direction and the tilt direction, and thus individual acceleration tables may be set for the pan direction and the tilt direction.

However, as described in the section of the problem to be solved by the invention, when the pan/tilt function and the crop function are used together in the pan/tilt apparatus, a captured video including unnaturalness in a screen change may be obtained. If the aspect ratio of a video remains unchanged before and after a crop operation, the operator readily operates the pan/tilt apparatus 101 by speed control using the above-described speed table and acceleration table. On the other hand, if the aspect ratio of a video changes before and after a crop operation, unnaturalness of a screen change is not much reduced and the operator has a sense of discomfort with operation feeling of the pan/tilt apparatus 101 before and after the crop operation.

To cope with this, the first embodiment will describe a form in which when the crop instruction unit 212 instructs a crop operation, the speed table and the acceleration table are adjusted and used based on a change in aspect ratio of a crop video.

Figure 7:
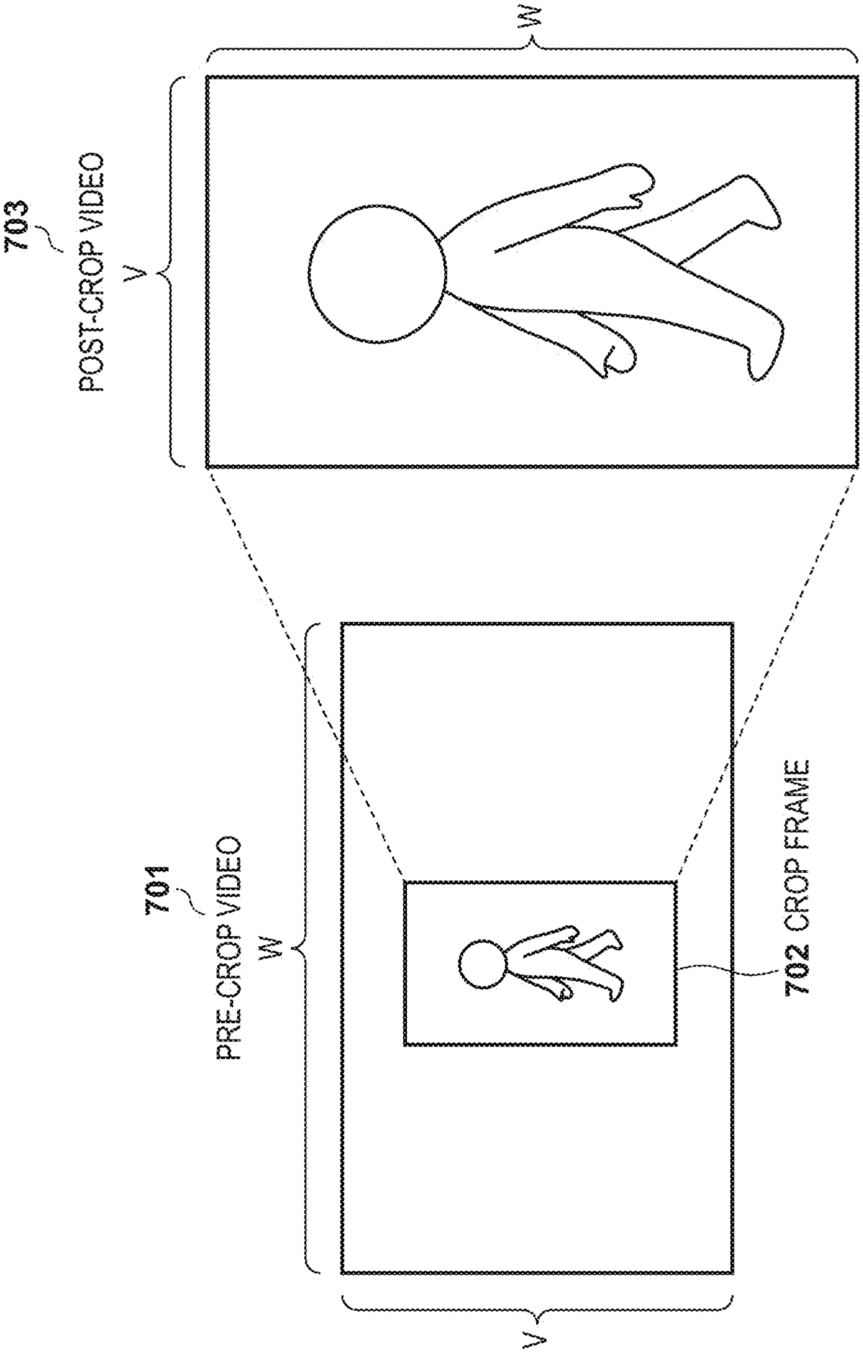
FIG. 7 is a view for explaining the aspect ratios of videos before and after a crop operation.

FIG. 7 is a view for explaining the aspect ratio of a video before and after a crop operation. FIG. 8 is a table showing examples of the adjustment amounts of the speed/acceleration before and after the crop operation. The system control unit 206 calculates the aspect ratio based on the received crop information, thereby calculating an adjustment coefficient. The adjustment coefficient is a value by which each numerical value in the speed table shown in FIG. 5 or each numerical value in the acceleration table shown in FIG. 6A is to be multiplied.

In a pre-crop video 701, the aspect ratio is "W:V". Consider a case where the pre-crop video 701 is cropped by a crop frame 702 to generate a post-crop video 703 with an aspect ratio "V:W".

In this case, based on the aspect ratio "V:W" of the post-crop video 703, the reference adjustment coefficient after the post-crop video 703 is obtained is set to "V/W" in the pan direction. By cropping the video, a magnification ratio (zoom-in) of X(X>1) is generally obtained. When a zoom-in operation is performed, an operation is readily performed by decreasing the speed, and thus the adjustment coefficient is set to "V/WX" by further multiplying the reference adjustment coefficient by "1/X". That is, when the pan speed in the pre-crop video 701 is "A", the pan speed in the post-crop video 703 is "AV/WX". With respect to the acceleration, when the pan acceleration in the pre-crop video 701 is "B", the pan acceleration in the post-crop video 703 is "BV/WX", similar to the above-described speed.

Consider the tilt direction next. When "W>V" as shown in FIG. 7, the post-crop video 703 is a portrait video. Therefore, it is desirable to move the tilt direction at a low speed, as compared with the pan direction. With respect to the tilt direction, to further decrease the adjustment coefficient, the above-described pan adjustment coefficient is further multiplied by "1/Y" to set the adjustment coefficient to "V/WXY" (Y>1). That is, when the tilt speed in the pre-crop video 701 is "C", the tilt speed in the post-crop video 703 is "CV/WXY". With respect to the value of Y, for example, Y=1.5 is set for a high-speed mode (speed stage 5 in FIG. 5), Y=2 is set for a normal mode (speed stage 3), and Y=3 is set for a low-speed mode (speed stage 1). With respect to the acceleration, when the tilt acceleration in the pre-crop video 701 is "D", the tilt acceleration in the post-crop video 703 is "DV/WXY", similar to the above-described speed.

By multiplying each value in the speed table and acceleration table by the adjustment coefficient and using it, as described above, it is possible to reduce unnaturalness of a screen change even when the aspect ratio of a video changes before and after the crop operation. Therefore, a sense of discomfort of the operator with operation feeling of the pan/tilt apparatus 101 before and after the crop operation is reduced. As a result, for example, when tracking the object (for example, the human body shown in FIG. 4), the operator of the operation apparatus 201 can easily operate the pan/tilt driving instruction unit 213 so the object does not deviate from the crop frame 402.

<Operation of Apparatus>

Figure 15:
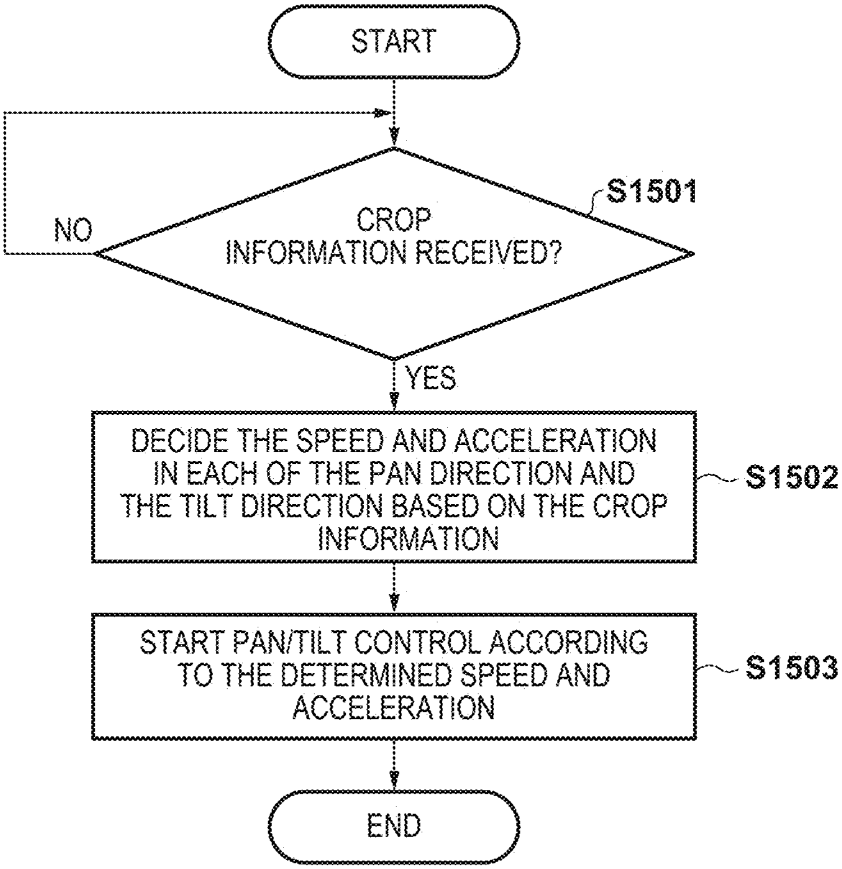
FIG. 15 is a flowchart of speed/acceleration setting when a crop operation is performed.

FIG. 15 is a flowchart of speed/acceleration setting when a crop operation is performed. Assume that the pan/tilt apparatus 101 captures a video at a full angle of view and distributes it. However, the present invention is not limited to the change from full angle-of-view video distribution to crop video distribution. For example, the processing may be performed when changing crop video distribution by a first crop frame to crop video distribution by a second crop frame.

In step S1501, the system control unit 206 determines whether the communication unit 208 receives crop information from the operation apparatus 201. As described above, when the operation apparatus 201 accepts a distribution instruction of a crop video from an operator, the crop information is transmitted to the pan/tilt apparatus 101. When the system control unit 206 determines that the crop information is received, and decides to shift to a crop operation mode, it transmits the crop information to the video processing unit 301, and advances the process to step S1502. If the system control unit 206 determines that the crop information is not received, it continuously waits for reception of the crop information.

Figure 9:
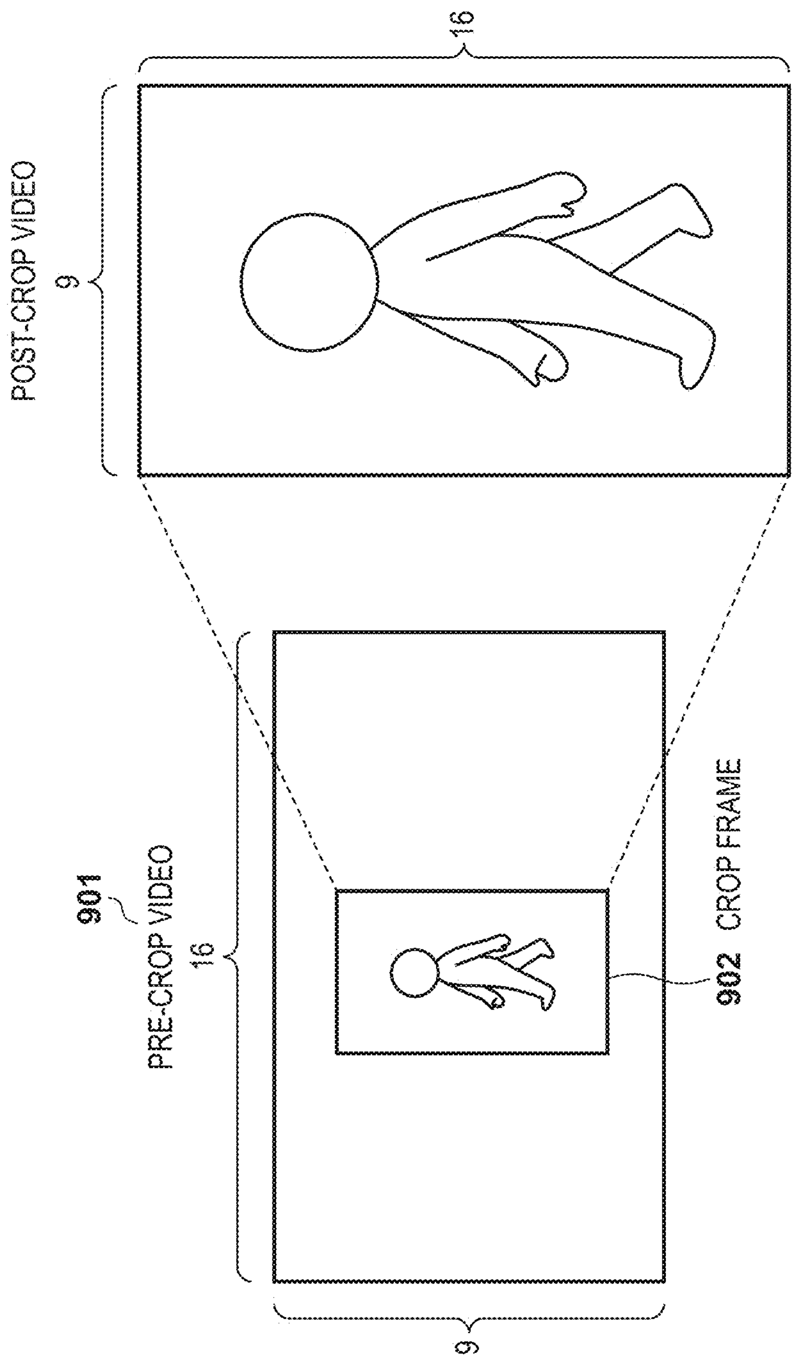
FIG. 9 is a view showing a practical example of a change in aspect ratio.

In step S1502, based on information, included in the crop information, for designating a crop region (crop frame), the video processing unit 301 generates a framed video and a crop video. FIG. 9 is a view showing a full angle-of-view video and a crop video, and showing a practical example of a change in aspect ratio. In this example, a full angle-of-view video as a pre-crop video 901 has an aspect ratio "16:9", and a crop video as a post-crop video 903 has an aspect ratio "9:16". Therefore, the video processing unit 301 generates a framed video by overlaying an image of a crop frame 902 on the pre-crop video 901. Furthermore, the video processing unit 301 crops the pre-crop video 901 by the crop frame 902, thereby generating the post-crop video 903.

In step S1502, the system control unit 206 decides the adjustment amounts of the speed/acceleration based on the information of the crop region (crop frame) included in the crop information. FIG. 10 is a table showing practical examples of the adjustment amounts of the speed/acceleration. In this case, based on the aspect ratio "9:16" of the post-crop video 903 (crop video), the reference adjustment coefficient after the post-crop video 903 is obtained is set to "9/16" in the pan direction. By cropping the video, a magnification ratio (zoom-in) of 2 is obtained, and thus the reference adjustment coefficient is further multiplied by "1/2" to set the adjustment coefficient to "9/32". That is, when the pan speed in the pre-crop video 901 is "A", the pan speed in the post-crop video 903 is "9A/32". With respect to the acceleration, when the pan acceleration in the pre-crop video 901 is "B", the pan acceleration in the post-crop video 903 is "9B/32", similar to the above-described speed.

Consider the tilt direction next. Since the post-crop video 903 is a portrait video, it is desirable to move the tilt direction at a low speed, as compared with the pan direction. With respect to the tilt direction, to further decrease the adjustment coefficient, the above-described pan adjustment coefficient is further multiplied by "1/2" to set the adjustment coefficient to "9/64". That is, when the tilt speed in the pre-crop video 901 is "C", the tilt speed in the post-crop video 903 is "9C/64". With respect to the acceleration, when the tilt acceleration in the pre-crop video 901 is "D", the tilt acceleration in the post-crop video 903 is "9D/64", similar to the above-described speed.

In step S1503, the system control unit 206 starts control based on the speed and acceleration in each of the pan direction and the tilt direction decided in step S1502. That is, when the system control unit 206 receives pan/tilt control information from the operation apparatus 201, it instructs, to the pan driving unit 202 and the tilt driving unit 203, control amounts obtained by multiplying the pan/tilt control information by the adjustment coefficients decided in step S1502.

As described above, according to the first embodiment, when switching to crop imaging in the pan/tilt (PT) camera, the settings of the speed and acceleration of PT driving are changed (the adjustment coefficients are set) in accordance with the change in aspect ratio of the video before and after the crop operation. This reduces unnaturalness of a screen change in the video before and after the crop operation. Therefore, the operator who operates the operation apparatus 201 while viewing the video displayed on the video display unit 210 readily performs pan/tilt control of the pan/tilt apparatus 101. That is, it is possible to reduce the possibility that the object deviates from the crop frame.

Note that a case where the aspect ratio becomes "V:W" after the crop operation (that is, a case where the aspect ratio is inverted with respect to the aspect ratio before the crop operation) has been described above. In a case where the aspect ratio is changed from "$W_1$:$V_1$" to "$W_2$:$V_2$" before and after the crop operation, the adjustment coefficient is preferably obtained by $\{W_2/(W_1+V_1)\}/\{W_1/(W_2+V_2)\}$. That is, the horizontal value (W) is important for the adjustment coefficient, and correction according to the change in aspect ratio is further performed.

Modification 1

In Modification 1, a form in which the operation apparatus 201 generates a framed video will be described. That is, the first embodiment has explained the form in which the video processing unit 207 of the pan/tilt apparatus 101 generates a framed video but the operation apparatus 201 may generate a framed video.

Figure 11:
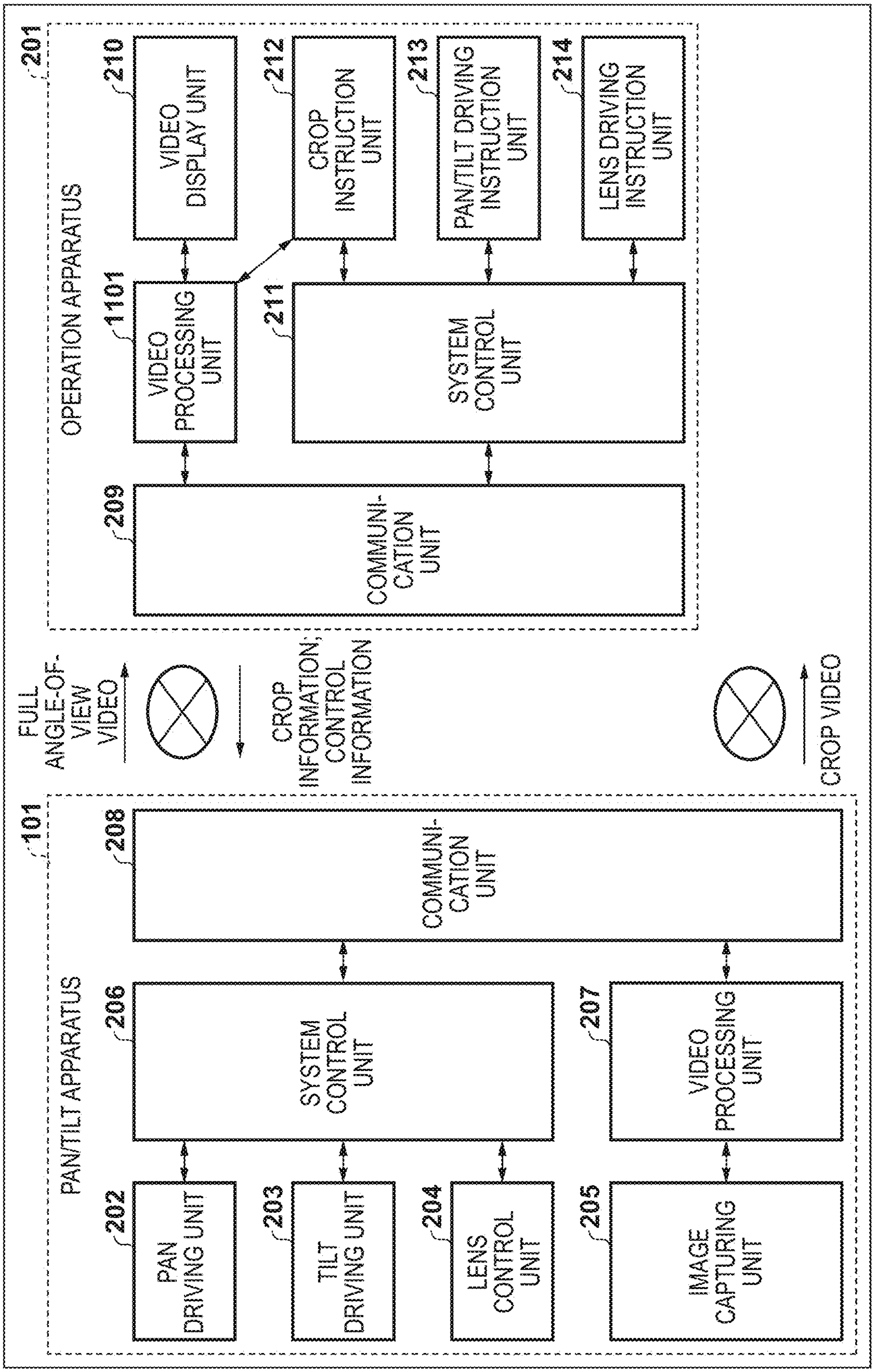
FIG. 11 is a block diagram showing the configuration of an imaging system (Modification 1)

FIG. 11 is a block diagram showing the configuration of an imaging system according to Modification 1. This configuration is mainly different from the first embodiment (FIG. 3) that a video processing unit 1101 is added.

Based on crop information acquired from the crop instruction unit 212, the video processing unit 1101 generates a framed video by overlaying an image of a crop frame on a full angle-of-view video received from the pan/tilt apparatus 101. The framed video is the same as the framed video 401 shown in FIG. 4. That is, the video in the crop frame of the framed video 401 and the crop video 403 are videos in the same region range, and the time is also synchronized. The generated framed video is displayed on the video display unit 210.

Modification 2

In Modification 2, a form in which the operation apparatus 201 sets a plurality of crop frames, and the pan/tilt apparatus 101 distributes a plurality of crop videos respectively corresponding to the crop frames will be described.

Figure 12:
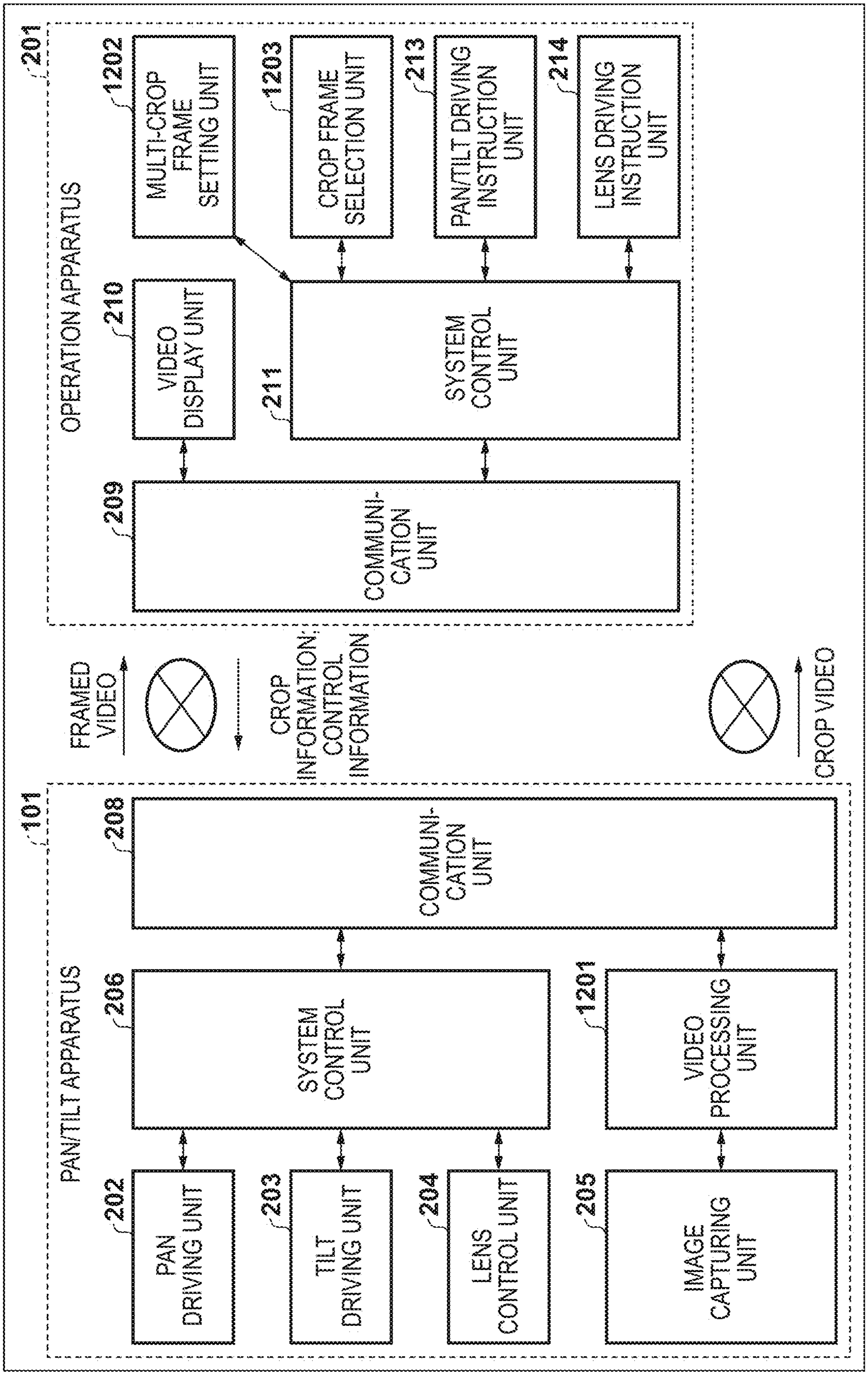
FIG. 12 is a block diagram showing the configuration of an imaging system (Modification 2)

FIG. 12 is a block diagram showing the configuration of an imaging system according to Modification 2. This configuration is different from the first embodiment (FIG. 3) that a multi-crop frame setting unit 1202 and a crop frame selection unit 1203 are arranged instead of the crop instruction unit 212 in the operation apparatus 201. Furthermore, the processing of a video processing unit 1201 in the pan/tilt apparatus 101 is different.

The multi-crop frame setting unit 1202 sets a plurality of crop frames each for designating the range of a crop video. The crop frame selection unit 1203 selects one crop frame from the plurality of crop frames set by the multi-crop frame setting unit 1202. The selected crop frame is a crop frame to be used by the operator of the operation apparatus 201 to perform pan/tilt control. For example, it is configured to accept the selection of the crop frame from the user via a GUI. That is, the operation apparatus 201 transmits, to the pan/tilt apparatus 101, crop information including information of the plurality of crop frames and information of the selected crop frame.

Based on the video signal generated by the image capturing unit 205 and the crop information received from the operation apparatus 201, the video processing unit 1201 transmits, to the operation apparatus 201, a framed video obtained by adding a plurality of crop-framed images to a full angle-of-view video. Note that based on the information of the selected crop frame included in the crop information, the video processing unit 1201 may generate a framed video that can discriminate between the selected crop frame and the unselected crop frames. For example, the thickness, type, color, or the like of a line representing the crop frame is changed. Furthermore, the video processing unit 1201 crops the video signal generated by the image capturing unit 205 in accordance with the crop information, thereby generating a crop video.

Figure 13:
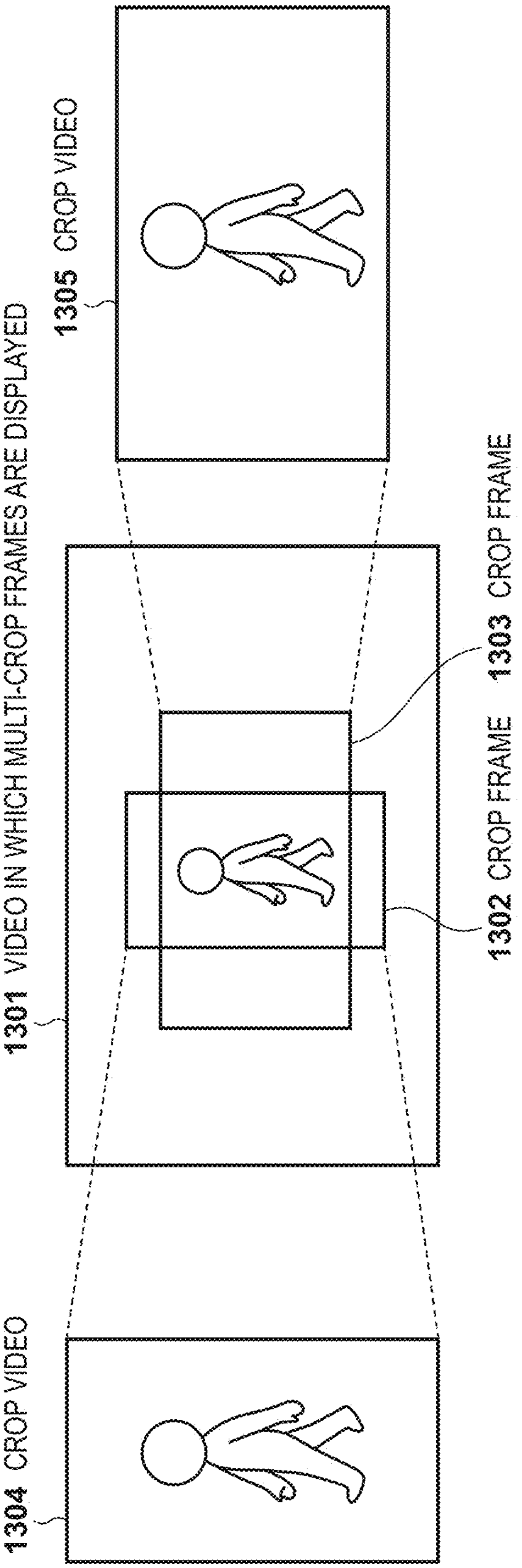
FIG. 13 is a view for explaining a video in which a plurality of crop frames are displayed, and crop videos.

FIG. 13 is a view for explaining a video in which a plurality of crop frames are displayed, and crop videos. Note that the crop frame is not limited to the rectangular shape and can be set by an arbitrary shape. The framed video generated by the video processing unit 1201 is, for example, a framed video 1301. A video cropped by a crop frame 1302 is a crop video 1304, and a video cropped by a crop frame 1303 is a crop video 1305. The crop videos 1304 and 1305 generated by the video processing unit 1201 are distributed via the communication unit 208.

Note that the system control unit 206 adjusts the speed and acceleration based on the selected crop frame included in the crop information. That is, if the crop frame selection unit 1203 changes the selected crop frame, the system control unit 206 adjusts the speed and acceleration again based on the changed selected crop frame included in the crop information.

Modification 3

In Modification 3, a form in which the operation apparatus 201 adjusts the speed and/or the acceleration will be described. That is, the first embodiment has explained the form in which the system control unit 206 of the pan/tilt apparatus 101 adjusts the speed and/or the acceleration but the operation apparatus 201 may adjust the speed and/or the acceleration.

Figure 14:
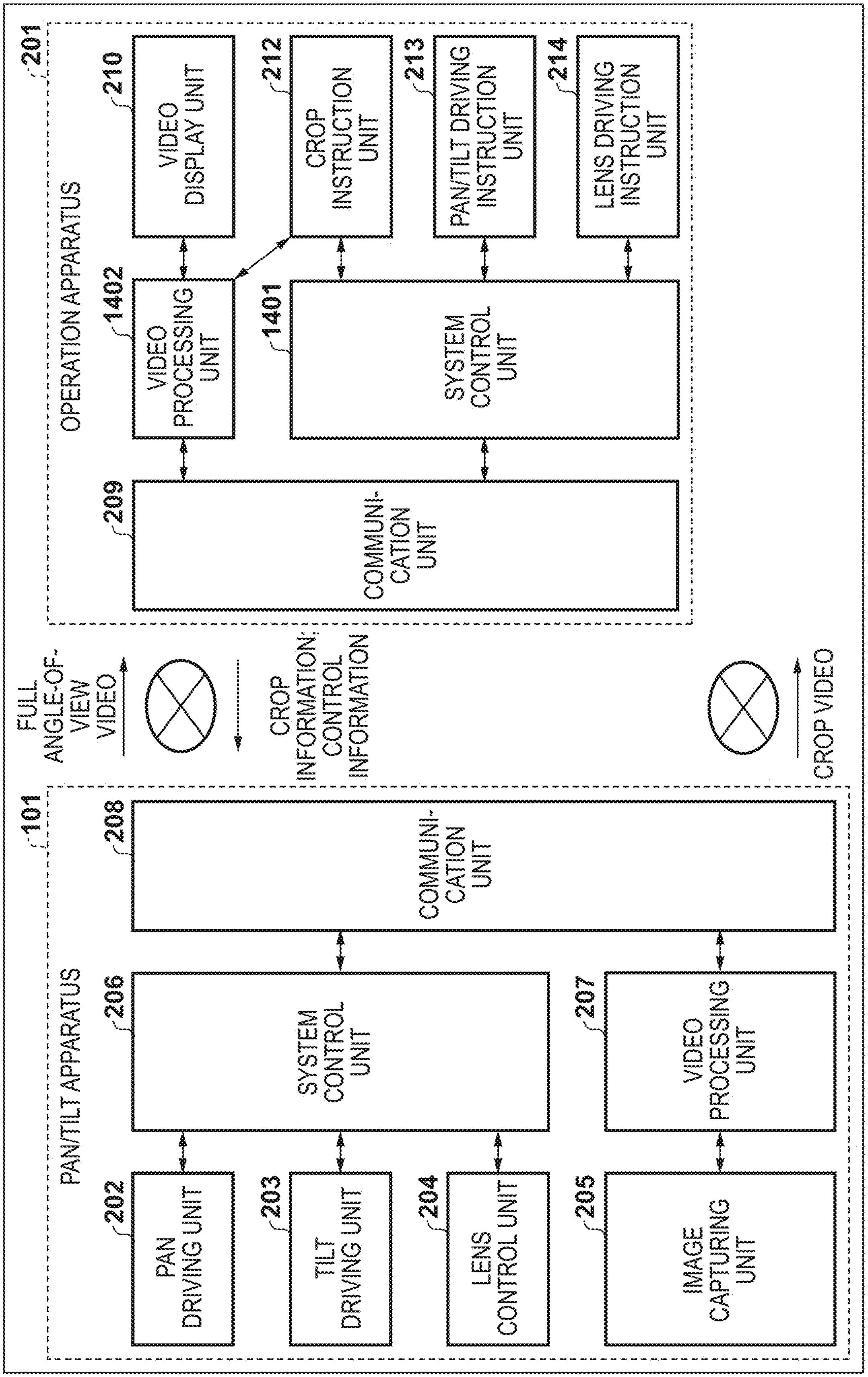
FIG. 14 is a block diagram showing the configuration of an imaging system (Modification 3)

FIG. 14 is a block diagram showing the configuration of an imaging system according to Modification 3. This configuration is mainly different from the first embodiment (FIG. 3) that a video processing unit 1402 is added and a system control unit 1401 adds processing.

The system control unit 1401 calculates the adjustment coefficient based on the crop information acquired from the crop instruction unit 212, and sends information of the adjusted speed and acceleration to the pan/tilt apparatus 101. That is, in Modification 3, the pan/tilt control information includes speed instruction information as information of the adjusted speed (and/or acceleration).

Similar to the video processing unit 1101 of Modification 1, based on the crop information acquired from the crop instruction unit 212, the video processing unit 1402 generates a framed video by overlaying an image of a crop frame on a full angle-of-view video received from the pan/tilt apparatus 101.

Other Embodiments

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-191717, filed Nov. 9, 2023 which is hereby incorporated by reference herein in its entirety.

What is claimed is:

1. A control apparatus for controlling an image capturing device capable of changing an imaging direction, comprising:

one or more memories storing computer instructions; and one or more processors executing the computer instructions to:

change the imaging direction of the image capturing device to a pan direction;

change the imaging direction of the image capturing device to a tilt direction; and process a video obtained by the image capturing device and output the processed video, wherein, in a case where the processed video is a crop video obtained by cropping the video, a driving speed in the pan direction is changed at least based on an aspect ratio of the processed video, and a driving speed in the tilt direction is changed at least based on the aspect ratio of the processed video, and wherein in a case where the aspect ratio of the video is V:W(V<W), the aspect ratio of the processed video is W:V, and a magnification ratio of an object in the processed video is X, a driving speed in the pan direction is V/WX times a reference pan speed, and a driving speed in the tilt direction is V/WXY times (Y>1) a reference tilt speed.

2. The control apparatus according to claim 1, wherein a driving acceleration in changing the imaging direction is changed at least based on the aspect ratio of the processed video.

3. The control apparatus according to claim 1, wherein a driving acceleration in changing the imaging direction is changed further based on a magnification ratio of an object in the video.

4. The control apparatus according to claim 1, wherein the one or more processors further execute the computer instructions to receive, from a user terminal that remotely controls the control apparatus, a first control command for changing the imaging direction and a second control command for cropping the video, the imaging direction is changed based on the first control command, the aspect ratio of the crop video is calculated based on crop information included in the second control command and the crop video is generated based on the crop information.

5. The control apparatus according to claim 4, wherein a framed video is generated by overlaying a crop frame on the video based on the crop information, and the framed video is transmitted to the user terminal.

6. The control apparatus according to claim 5, wherein the crop information includes information concerning a plurality of crop frames, and information concerning one selected crop frame selected from the plurality of crop frames, and the framed video is generated by overlaying the plurality of crop frames, and the selected crop frame is distinguishably displayed in the framed video.

7. The control apparatus according to claim 1, wherein the one or more processors further execute the computer instructions to receive, from a user terminal that remotely controls the control apparatus, a first control command for changing the imaging direction and a second control command for cropping the video, the first control command includes speed instruction information based on the aspect ratio of the crop video, which is calculated based on crop information included in the second control command, the imaging direction is changed based on the first control command, and the crop video is generated based on the crop information.

8. A control method for a control apparatus that controls an image capturing device capable of changing an imaging direction, the method comprising:

changing the imaging direction of the image capturing device to a pan direction;

changing the imaging direction of the image capturing device to a tilt direction; and processing a video obtained by the image capturing device and output the processed video, wherein in a case where the processed video is a crop video obtained by cropping the video, a driving speed in the pan direction is changed at least based on an aspect ratio of the processed video, and a driving speed in the tilt direction is changed at least based on the aspect ratio of the processed video, wherein in a case where the aspect ratio of the video is V:W(V<W), the aspect ratio of the processed video is W:V, and a magnification ratio of an object in the processed video is X, a driving speed in the pan direction is V/WX times a reference pan speed, and a driving speed in the tilt direction is V/WXY times (Y>1) a reference tilt speed.

9. A non-transitory computer-readable recording medium storing a program that, when executed by a computer, causes the computer to perform a control method for a control apparatus that controls an image capturing device capable of changing an imaging direction, the method comprising:

changing the imaging direction of the image capturing device to a pan direction;

changing the imaging direction of the image capturing device to a tilt direction; and processing a video obtained by the image capturing device and output the processed video, wherein in a case where the processed video is a crop video obtained by cropping the video, a driving speed in the pan direction is changed at least based on an aspect ratio of the processed video, and a driving speed in the tilt direction is changed at least based on the aspect ratio of the processed video, wherein in a case where the aspect ratio of the video is V:W(V<W), the aspect ratio of the processed video is W:V, and a magnification ratio of an object in the processed video is X, a driving speed in the pan direction is V/WX times a reference pan speed, and a driving speed in the tilt direction is V/WXY times (Y>1) a reference tilt speed.

* * * * *